(12) United States Patent
Xiong et al.

(10) Patent No.: US 9,769,896 B1
(45) Date of Patent: Sep. 19, 2017

(54) LED DRIVER WITH OFFLINE TUNING INTERFACE USING HOT AND NEUTRAL INPUTS

(71) Applicant: Universal Lighting Technologies, Inc., Madison, AL (US)

(72) Inventors: Wei Xiong, Madison, AL (US); Travis L. Berry, Madison, AL (US); Keith Davis, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/292,261

(22) Filed: Oct. 13, 2016

Related U.S. Application Data

(60) Provisional application No. 62/263,296, filed on Dec. 4, 2015.

(51) Int. Cl.
*H05B 33/08* (2006.01)
*H02M 3/335* (2006.01)

(52) U.S. Cl.
CPC .... *H05B 33/0845* (2013.01); *H02M 3/33507* (2013.01); *H05B 33/0812* (2013.01); *H05B 33/0815* (2013.01); *H05B 33/0854* (2013.01)

(58) Field of Classification Search
CPC ............ H05B 33/0845; H05B 33/0815; H05B 37/032; H05B 37/036; H05B 39/06; H05B 37/02; H05B 33/0812; H05B 41/2828; H05B 33/086; H05B 33/0854; H02M 3/33507
See application file for complete search history.

(56) References Cited

U.S. PATENT DOCUMENTS

| | | | | |
|---|---|---|---|---|
| 8,264,165 B2 * | 9/2012 | Gu | ..................... | H05B 33/0815 315/209 R |
| 8,624,523 B2 * | 1/2014 | Briggs | ............... | H05B 37/0245 315/291 |
| 8,853,958 B2 | 10/2014 | Athalye et al. | | |
| 9,131,581 B1 | 9/2015 | Hsia et al. | | |
| 9,374,855 B2 * | 6/2016 | Siessegger | ......... | H05B 33/0803 |
| 9,629,209 B1 * | 4/2017 | Xiong | ................ | H05B 33/0815 |
| 2009/0079357 A1 | 3/2009 | Shteynberg et al. | | |

(Continued)

*Primary Examiner* — Vibol Tan
(74) *Attorney, Agent, or Firm* — Patterson Intellectual Property Law, P.C.; Mark J. Patterson; Gary L. Montle

(57) ABSTRACT

An LED driver tuning system includes an LED driver configured to receive a tuning interface device at line and neutral mains inputs. During online operation, a power converter generates output power to LED arrays based on dimming control signals and programmed operating parameters. The tuning interface device provides predetermined sequences of digital pulses to a controller during offline mode of operation, wherein the controller modifies programmed operating parameters upon decoding the predetermined sequence of digital pulses and determining a corresponding target value for the parameter(s). Upon reinitiating online operation, the output power generated by the power converter is regulated based on the dimming control signal, a sensed output from the power converter, and the modified programmed operating parameters. A tuning confirmation circuit is configured to generate an inverse of the predetermined sequence of digital pulses so the tuning device can confirm proper receipt of the signals.

20 Claims, 8 Drawing Sheets

(56) References Cited

U.S. PATENT DOCUMENTS

| | | |
|---|---|---|
| 2011/0285311 A1 | 11/2011 | Yang et al. |
| 2012/0249001 A1 | 10/2012 | Okubo et al. |
| 2013/0082604 A1 | 4/2013 | Williams et al. |
| 2014/0117868 A1 | 5/2014 | Lopez et al. |
| 2014/0125241 A1 | 5/2014 | Elferich et al. |
| 2014/0253562 A1 | 9/2014 | Yaras |
| 2014/0303782 A1 | 10/2014 | Pruchniewski et al. |
| 2015/0091461 A1 | 4/2015 | Nakamura et al. |
| 2015/0180337 A1 | 6/2015 | Ooga |
| 2015/0327340 A1 | 11/2015 | Siessegger et al. |
| 2016/0299555 A1 | 10/2016 | Rucker et al. |

\* cited by examiner

LED DRIVER WITH OFFLINE TUNING INTERFACE USING HOT AND NEUTRAL INPUTS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/263,296, filed Dec. 4, 2015, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to circuitry and methods for powering a light source such as an LED load. More particularly, the present invention relates to methods for dynamic adjustment of power parameters for LED drivers.

Light emitting diode ("LED") lighting is growing in popularity due to decreasing costs and long life compared to incandescent lighting and fluorescent lighting. LED lighting can also be dimmed without impairing the useful life of the LED light source.

LED loads are DC current driven, so a DC-DC or AC-DC converter is needed to regulate the current going through the LED to control the output power and luminance. An exemplary dimmable LED driver 100 is represented in FIG. 1. As shown, a typical four-wire output 0-10v controllable AC-DC converter 114 is coupled between the AC mains input 112 and the LED load 116. This AC-DC converter regulates the DC current going through the LED lighting module 116 and also receives control signals from a dimming control block 118 to set the output current dynamically. Typically, a DC voltage 120 is provided, for example, from a remote dimming control source as the input of the dimming control block 118. The dimming control block will sense the voltage level 120 and set a control signal 122 for the reference of LED output current according to a preset relationship between the two values 120, 122.

To those in the field of LED fixture design and manufacturing, it would be very desirable to provide the same LED drivers for installation across a wide range of light fixtures, and then be able to adjust output current to the rated current of respective LED loads for each specific fixture without powering the whole system up.

BRIEF SUMMARY OF THE INVENTION

In accordance with the present disclosure and inventions as described herein, it may be appreciated that one way to provide the aforementioned desirable features is to use the input wires (hot and neutral) as an offline current tuning (adjusting) interface, because the input wires are always accessible even after the driver has been installed in the light fixture.

LED driver circuit designs as disclosed herein are accordingly designed to use LED driver input wires (hot and neutral) as the tuning interface so that the operating range of the LED driver may be dynamically tuned when the driver is in an offline state.

In one embodiment, an LED driver tuning system as disclosed herein includes first and second input power terminals and a power converter configured to generate an output voltage and an output current for driving an LED array, responsive to input power provided across the first and second input power terminals during an online mode of operation. A tuning interface device is configured for coupling to at least the first and second input power terminals during an offline mode of operation. A dimming controller is configured to generate a dimming control signal based on an input received across first and second dimming input terminals during an online mode of operation, and is further configured during the offline mode of operation to modify one or more programmed operating parameters based on a predetermined sequence of digital pulses received via the tuning interface device. The output voltage and the output current generated by the power converter is accordingly regulated during the online mode of operation based on the dimming control signal, a sensed output from the power converter, and the one or more programmed operating parameters.

In one exemplary aspect of the aforementioned embodiment, a capacitor may be coupled on a first end between the first input power terminal and the power converter. A first side of an isolation circuit (e.g., a primary winding of a transformer) may be coupled between a second end of the capacitor and the second input power terminal. A second side of the isolation circuit (e.g., a secondary winding of the transformer) may be coupled to the controller. In such a configuration, substantially zero voltage is provided from the first side to the second side of the isolation circuit during the online mode of operation, and the predetermined sequence of digital pulses received from the tuning interface device are transmitted to the controller via the first side and the second side of the isolation circuit.

In another exemplary aspect of the aforementioned embodiment, the tuning interface device is configured to provide high-frequency bursts in a coded envelope sequence. The second side of the isolation circuit includes a tuning signal receiving circuit configured to generate a sequence of digital pulses corresponding to the burst envelope sequence. The controller is configured to decode the sequence of digital pulses corresponding to the burst envelope sequence and determine the one or more programmed parameters for the predetermined sequence of digital pulses.

In another exemplary aspect of the aforementioned embodiment, the second side of the isolation circuit further includes a diode rectifier circuit coupled across an input from the first side of the isolation circuit, wherein the tuning signal receiving circuit is coupled across an output end of the diode rectifier circuit and a circuit ground.

In another exemplary aspect of the aforementioned embodiment, the second side of the isolation circuit further includes a tuning confirmation circuit coupled to the dimming controller and configured to short the output end of the diode rectifier circuit to circuit ground in response to a predetermined sequence of digital pulses received from the controller and corresponding to the predetermined sequence of digital pulses received by the controller from the tuning signal receiving circuit.

In another exemplary aspect of the aforementioned embodiment, the tuning confirmation circuit further includes a switching element coupled across the output end of the diode rectifier circuit and the circuit ground and having its gate electrode coupled to the controller. A tuning confirmation voltage corresponding to a high (1) digital pulse received via the controller turns on the switching element, and a tuning confirmation voltage corresponding to a low (0) digital pulse received via the controller turns off the switching element. The tuning confirmation voltage may be coupled to an input terminal for the tuning interface device, wherein the tuning interface device compares a sequence of tuning confirmation voltage inputs to an inverse of the predetermined sequence of digital pulses to determine whether the sequences match.

In yet another exemplary aspect of the aforementioned embodiment, the one or more programmed operating parameters may preferably include a maximum output current generated by the power converter, but may otherwise or further include a maximum output voltage, a dimming curve, a maximum temperature protection threshold, and the like.

In yet another exemplary aspect of the aforementioned embodiment, the power converter may be regulated to provide constant output power control during the online mode of operation.

In yet another exemplary aspect of the aforementioned embodiment, the controller may be configured to identify a target maximum output current based on a predetermined sequence of digital pulses received via the tuning interface device, and to further modify the programmed maximum output current and a programmed maximum output voltage based on the target maximum output current and a programmed constant power for the power converter.

DETAILED DESCRIPTION OF THE INVENTION

Figure 1:
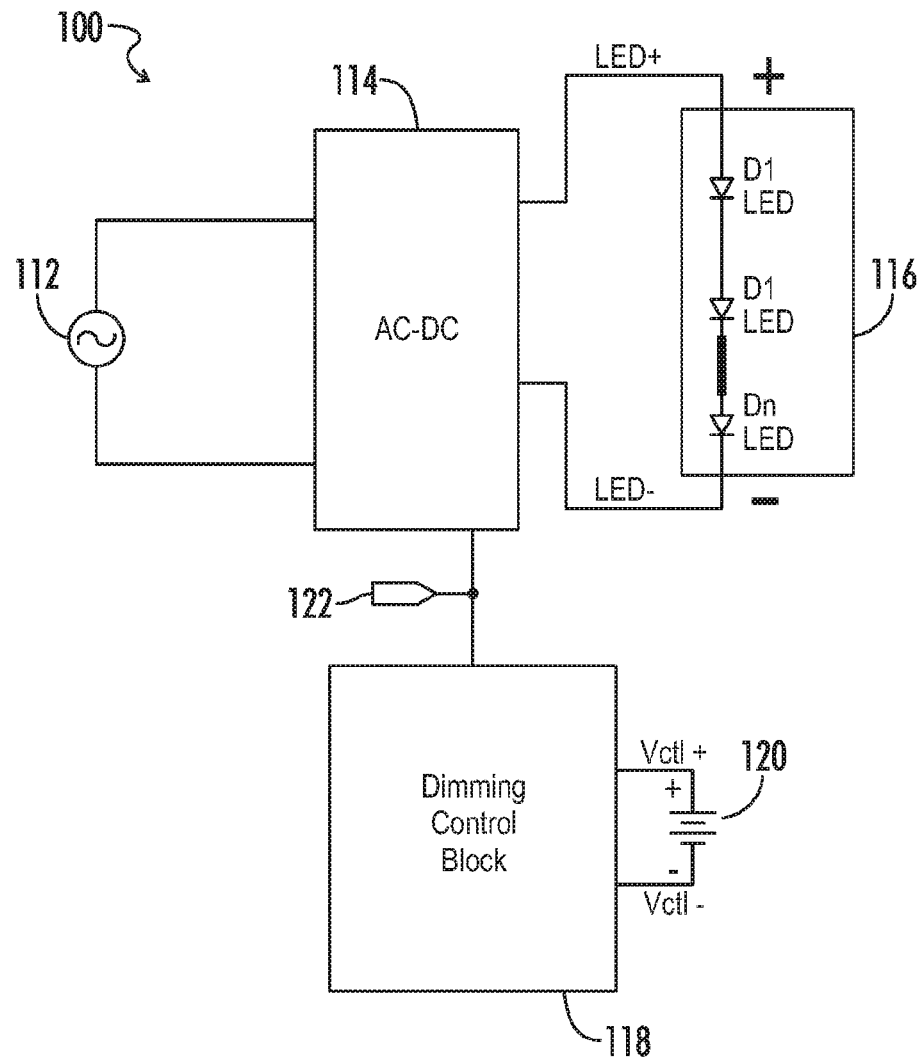
FIG. 1 is a block diagram representing a conventional dimmable LED driver circuit.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-8, an LED driver and associated methods according to the present invention are now illustrated in greater detail. Where the various figures may describe embodiments sharing various common elements and features with other embodiments, similar elements and features are given the same reference numerals and redundant description thereof may be omitted below.

Various embodiments of an LED driver according to the present invention may be designed to drive LED lighting elements with constant power. Embodiments of an LED driver may further be designed such that an output voltage maximum limit and/or output current maximum limit may be dynamically adjusted. The LED driver, associated circuitry and methods as presented in this disclosure further address the stated objective of consolidation, and is offline tunable without requiring the addition of any extra output wires.

Figure 2:
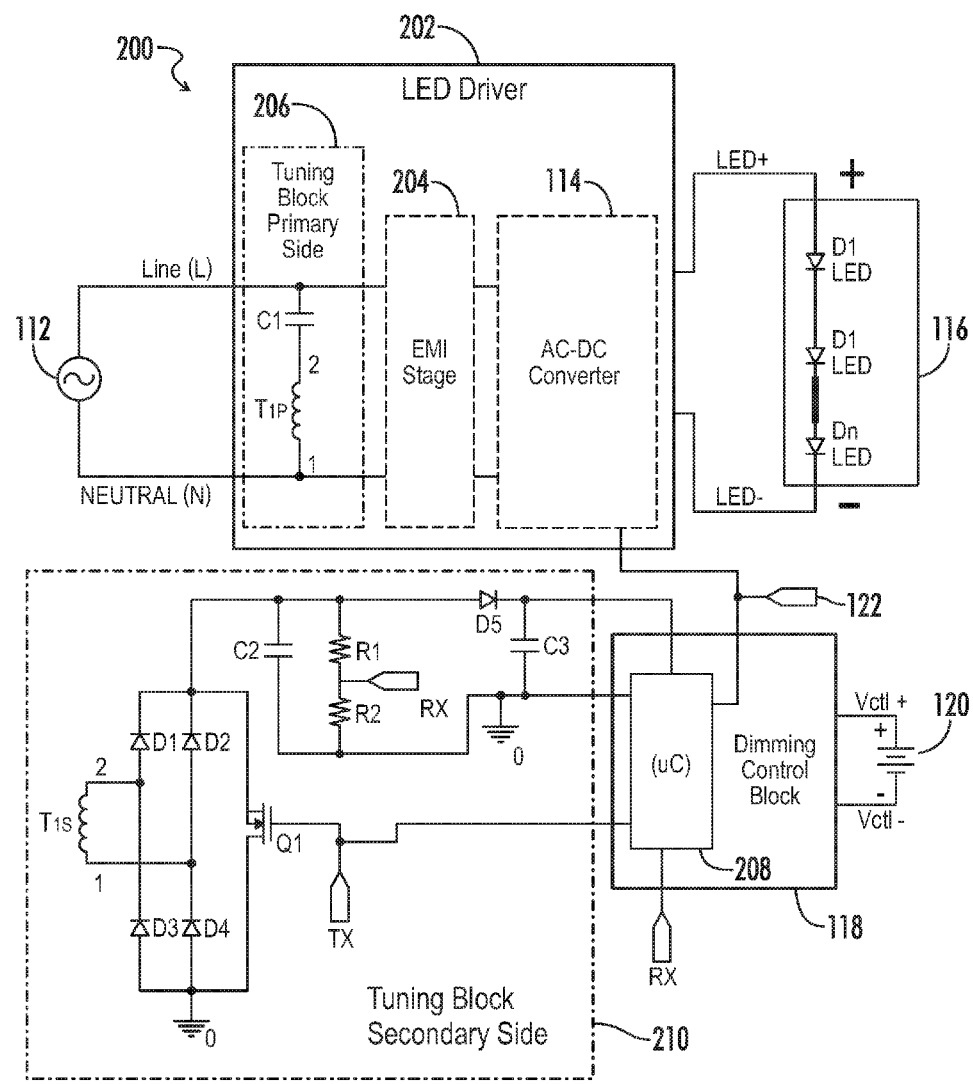
FIG. 2 is a block diagram and partial schematic diagram representing an embodiment of an LED driver according to the present invention, in online operation with AC power source and dimming interface.

Referring first to FIG. 2, an LED driver 200 of the present invention may first be described with respect to online (e.g., steady state) operation. As with the conventional LED driver described above, a controllable power converter 114 is still provided for output current regulation. The power converter 114 can receive an LED current control signal 122 and an LED voltage control signal (not shown) to dynamically regulate operation of the converter and thereby the output current and voltage. The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

A controller 208 may be used for example to sense the LED current, to sense the output voltage, and further to decode a dimming signal (Vctl+, Vctl−) that is provided from an external source and dynamically change the output current. The controller 208 forces the sensed LED current to be proportional to the sensed dimming control signal.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

In various embodiments, separate controllers may be provided with respect to the controller 208 for dimming control functions and another controller (not shown) internal to the power converter block 114 for power converter operating functions, such as for example the generation of control signals for driving switching elements associated with the power converter. In certain embodiments, a single controller may for example be provided for each of said functions, without departing from the scope of an invention as disclosed herein.

Typically a DC voltage source 120 is connected between first and second dimming interface inputs V_ctl+ and V_ctl−, respectively, for dimming control. The output current can be changed via the controller 208 by adjusting the amplitude of the dimming control signal provided across the dimming interface inputs. For example, the controller 208 may sense the dimming control signal and regulate or adjust the LED current output dynamically by forcing the current control signal 122 to be equal to a sensed current signal.

A tuning circuit according to the present embodiment may include two functionally linked blocks, one on a first side 206 of a tuning isolation circuit and another on a second side 210 of a tuning isolation circuit.

In the example shown, a tuning block primary side 206 is placed between the line and neutral mains inputs, and before an EMI stage 204 of the LED driver 202. In an embodiment of this block, a low frequency current limiting capacitor C1 and a primary winding of a high frequency transformer $T_{1P}$ are connected in series. In normal online operation the AC mains input voltage is either 50 Hz or 60 Hz, so capacitor C1 will greatly limit the current into the primary winding of the transformer $T_{1P}$. As a result, in normal operation of the LED driver the voltage across the primary winding $T_{1P}$ is substantially (very close to) zero.

In the example shown, a tuning block secondary side 210 includes a secondary winding $T_{1S}$ of the isolation circuit, which is also the input of a diode bridge D1-D4 which rectifies a current through the secondary winding. A switching element Q1 is connected between an output of the diode bridge and a circuit ground. The switching element Q1 is controlled by the controller 208 in the dimming control block 118 to open or short the diode bridge. At the output of the bridge a capacitor C2 is coupled in parallel with resistors R1 and R2 themselves coupled in series, and which collectively form a main signal receiving circuit. Resistors R1 and R2 form a voltage divider, wherein the voltage across the resistor R2 is fed back to the controller 208 as a receiving signal Rx. Diode D5 and capacitor C3 are further coupled in series across the voltage divider, and help power up the controller 208 at the outset of an offline tuning operation.

Figure 3:
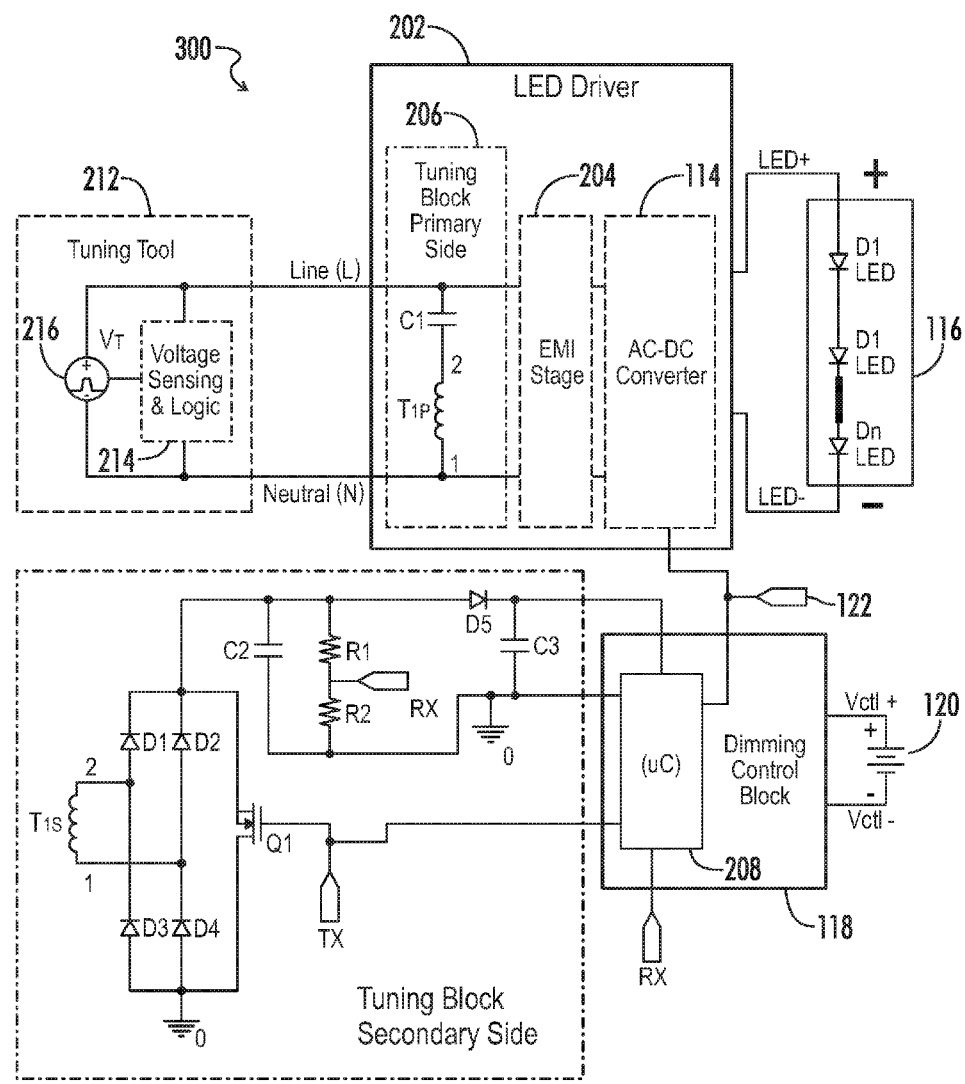
FIG. 3 is a block diagram and partial schematic diagram representing an embodiment of the LED driver of FIG. 2, in offline operation with tuning interface device applied.
Figure 7:
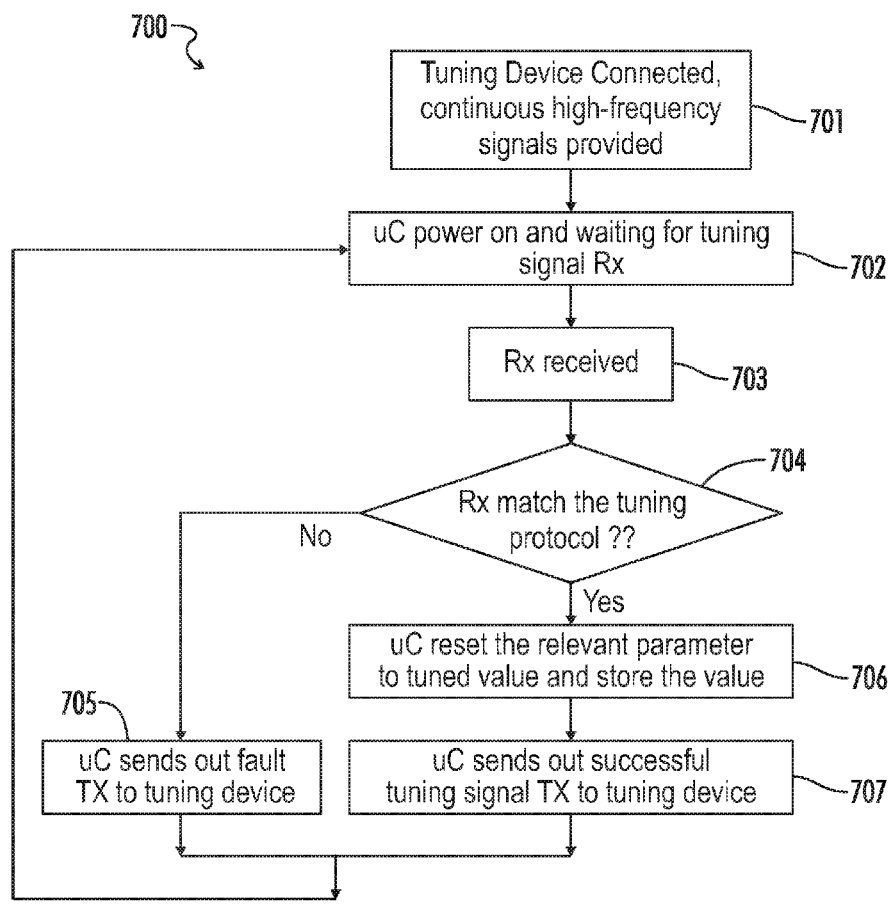
FIG. 7 is a flowchart representing an exemplary offline mode of operation according to an embodiment as disclosed herein.

An embodiment of an offline tuning principle 700 of the present invention may now be described with reference to FIGS. 3 and 7. The LED driver of FIG. 2 is now represented in an offline context as 300, although no extra wiring has been added to obtain the offline tuning functions as further described herein.

A tuning interface device 212 is provided to implement the tuning function, wherein a low power, high frequency tuning source (voltage or current source) 216 may be applied between the line and neutral mains input terminals (step 701). As shown in FIG. 3, the tuning device 212 may include a controlled source VT. This source has an output impedance so that even if the output is shorted it would still be functional. The tuning device also may include a voltage sensing and logic block 214 for tuning and tuning confirmation.

Because the tuning source 216 is a low voltage input, the power converter 114 of the LED driver 202 will not work after the tuning device 212 is connected to the driver. In other words, everything after the EMI stage 204 will be functionally disabled during an offline (tuning) mode of operation.

While the tuning device 212 is connected but prior to a tuning operation, the tuning source in various embodiments will continuously send out a series of high frequency signals in an idle mode of operation (step 702), to power up the controller 208 in the dimming control block 118 and to further optionally communicate with the controller 208.

Figure 4:
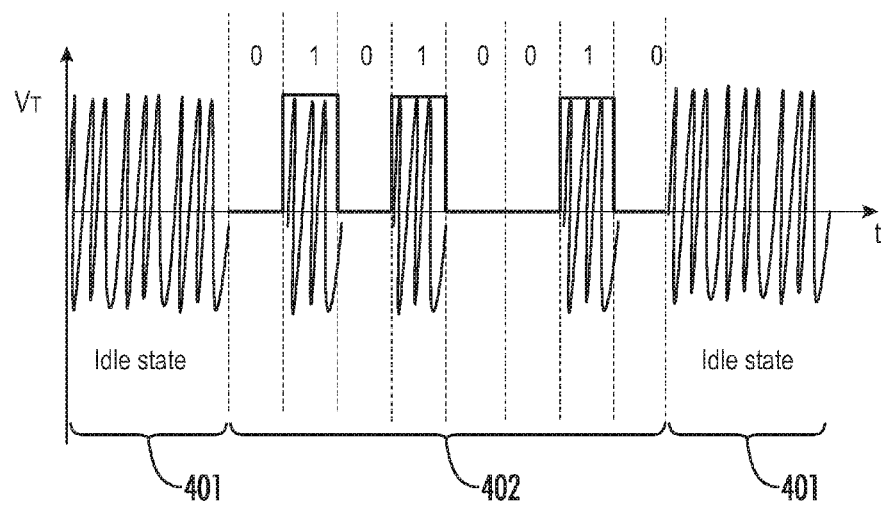
FIG. 4 is a graphical plot representing an exemplary working principle of a tuning interface device according to the system of FIG. 3.

Referring next to FIG. 4, the tuning source 216 functions continuously at a high frequency during idle stage 401. The primary winding $T_{1P}$ will sense the continuous high frequency voltage and pass it to the secondary winding $T_{1S}$. The diode bridge D1-D4 will rectify the tuning signal to provide a DC output across the capacitor C2. The diode D5 further rectifies the voltage across the capacitor C2. Capacitor C3 is charged thereby and further acts as an auxiliary offline power supply for powering up the controller 208. Diode D5 will also prevent the capacitor C3 from being discharged when the switching element Q1 conducts in the confirmation process as further described below.

During a tuning stage 402 of the offline mode of operation, a burst signal will be sent out by the tuning source 216 (as further demonstrated in FIG. 4). The tuning source may for example send out a series of high frequency signal bursts VT between the line and neutral inputs. The secondary winding $T_{1S}$ will repeat the signal, whereupon the signal is further rectified and provided across the resistor R2 in a manner as may be used for the controller 208 to decode a corresponding target value for one or more operating parameters.

Figure 5:
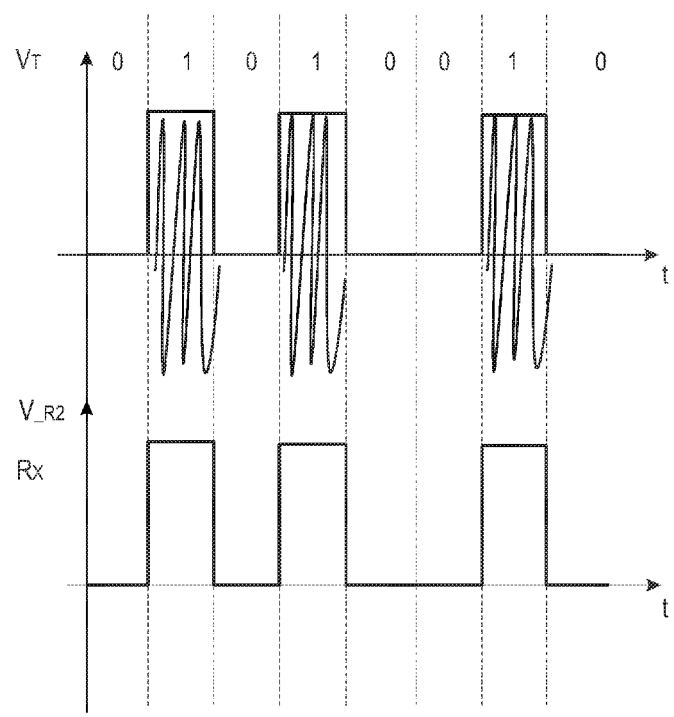
FIG. 5 is a graphical plot representing an exemplary working principle of a tuning signal receiving circuit for respective inputs from the tuning interface device according to the system of FIG. 3.

Exemplary signals across resistor R2 are shown in FIG. 5, as corresponding with received high frequency signal bursts VT from the tuning source 216. As shown, the voltage across the resistor R2 follows the tuning source signal burst envelope. The controller 208 will decode the signal Rx (step 703) and set and store the maximum LED output current reference 122, so that the next time that the LED driver is powered up the maximum output current will follow the new reference 122 (step 705).

It may be appreciated by those of skill in the art that not only the maximum current can be adjusted through this tuning process, but rather a multitude of additional parameters can be dynamically adjusted in this way, such as for example output voltage, dimming curve, maximum temperature protection threshold, etc. It may be that any one such parameter is programmed to be modified accordingly, or a string of parameters may be adjusted in accordance with a predetermined sequence of digital pulses. In another example, the tuning source 216 may provide a digital pulse signal indicating which one or more of a plurality of possible parameters are to be adjusted, followed by digital pulse signals indicating target values for the indicated parameters.

In an embodiment, the system 200, 300 may further be configured to generate a tuning confirmation signal after adjustment by the controller 208 of the programmed parameter (e.g., maximum output current) so that a user may confirm if the tuning process was successful or not (i.e., based on the results of the query represented in step 704). To achieve this goal, the switching element Q1 may be provided across the output of the diode bridge D1-D4.

Figure 6:
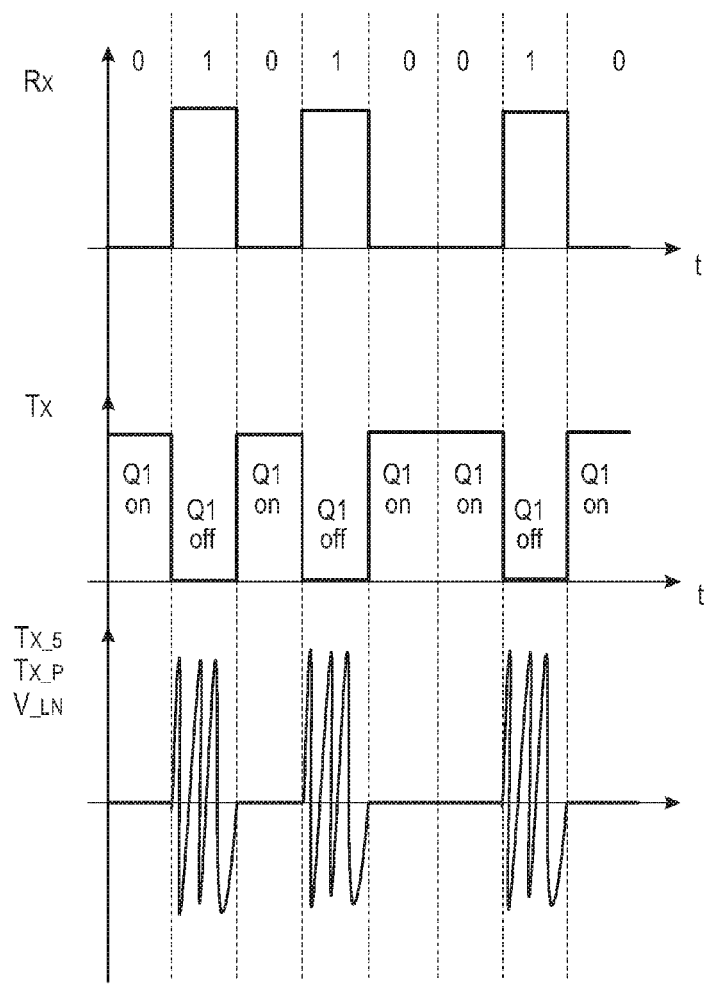
FIG. 6 is a graphical plot representing an exemplary working principle of a tuning confirmation circuit for producing an inverse sequence to the respective inputs from the tuning interface device according to the system of FIG. 3.

If the tuning is successful (i.e., "yes" in response to query 704 in FIG. 7), controller 208 will send out an inverse (reversed) signal Rx as a confirmation signal Tx to the switching element Q1, as shown for example in FIG. 6. When the confirmation signal Tx is high, the switching element Q1 turns on and shorts the diode bridge D1-D4, as well as the secondary winding $T_{1S}$. For example, the switching element Q1 will be turned off at channels in a digital pulse sequence for Tx corresponding to a channel at digital signal output Rx having a "high" voltage (equivalent to digital "1"). When the switching element Q1 is on, the voltage at digital signal output Rx is a "low" voltage (equivalent to digital "0"). If the primary and secondary windings of the transformer T1 are adequately coupled then the primary winding $T_{1P}$ will be shorted as well. As a result, the voltage across the tuning block primary side 206 will be very small, since the high frequency impedance of the capacitor C1 is very small.

The tuning device 212 may include a tuning circuit 214 which after sending out the tuning signal will sense the voltage across the line and neutral mains input lines and convert it into a digital signal. The tuning circuit 214 may then compare the received signal with the tuning output signal to see if those two match, thereby verifying if the tuning operation was successful or not (step 707).

In an embodiment, if a sensed signal Rx does not match the preset protocol (i.e., "no" in response to query 704 in FIG. 7), the controller 208 will send out a failure signal Tx to the tuning device 212 (step 705).

In various embodiments, the tuning device 212 may be provided with an indicator such as for example a green light which will indicate successful programming, or otherwise a red light may be used to indicate programming failure.

Figure 8:
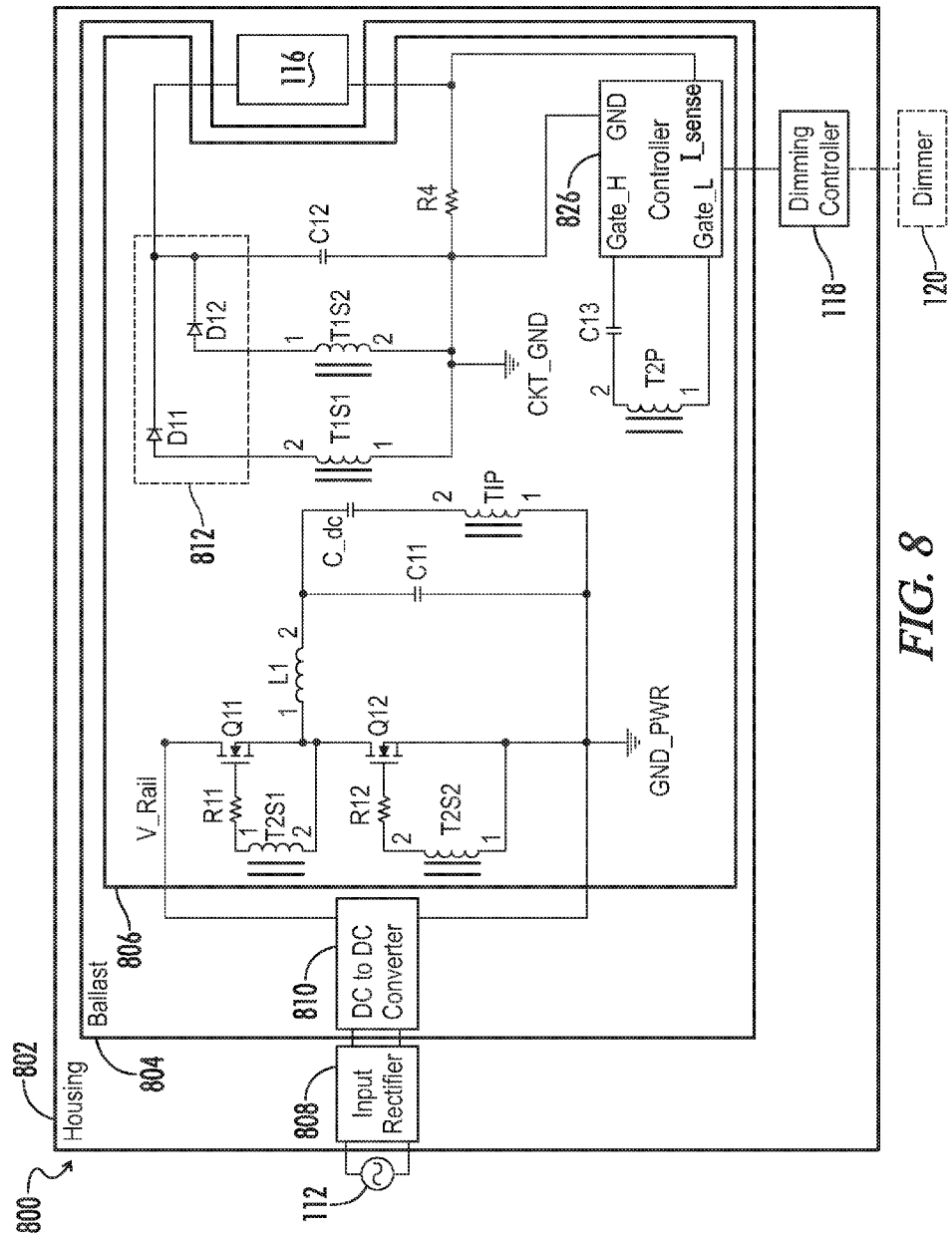
FIG. 8 is a block diagram and partial schematic diagram representing an embodiment of a light fixture having an LED driver as disclosed herein.

FIG. 8 further illustrates an example of a light fixture 800 with an embodiment of the LED driver as disclosed herein. While FIG. 8 may provide a more detailed recitation of an exemplary power converter, for example, with respect to exemplary LED drivers, the description provided below is not intended as limiting in any way on the scope of the present invention.

The exemplary light fixture 800 includes a housing 802, a ballast 806 such as an LED driver, and an LED array 116 as a light source. The light fixture 800 receives power from an alternating current (AC) power source 112 and provides current to the LED array 116. The housing 802 is coupled to the ballast 806 and the light source 116, and in one embodiment may support the ballast 806 and the light source 116 in a predetermined spatial relationship. The light fixture 800 also includes a dimming circuit 118 to provide a dimming signal to the controller 826 which is indicative of a target current or light intensity level for the light source 116.

The ballast 806 includes an input rectifier 808 and a driver circuit 804. The input rectifier 808 connects to the AC power source 112 and provides a DC power source having a power rail V_RAIL and a ground GND_PWR at an output of the input rectifier 808. In one embodiment, the ballast 806 also includes a DC-to-DC converter 810 connected between the input rectifier 808 and the driver circuit 804. The DC-to-DC converter 810 alters a voltage of a power rail V_RAIL of a DC power source provided by the input rectifier 808. The driver circuit 804 provides current to the light source 116 from the DC power source provided by the input rectifier 808.

The driver circuit 804 includes a half-bridge inverter, a resonant tank circuit, an isolating transformer T1, an output rectifier 812, and the controller 826. The half-bridge inverter includes a first switch Q11 (i.e., a high side switch) and a second switch Q12 (i.e., a low side switch) and has an input connected to the power rail V_RAIL and the ground GND_PWR of the DC power source, and an AC signal output. In one embodiment, the input of the half-bridge inverter is a high side of the high side switch, and a low side of the low side switch (e.g., second switch Q12) connects to the ground of the DC power source.

The resonant tank circuit includes at least a resonant inductor L1 and a resonant capacitor C11. An input of the resonant tank circuit (e.g., a first terminal of a resonant inductor L1) is connected to the output of the half-bridge inverter. The resonant capacitor C11 is connected in series with the resonant inductor L1 between the output of the half-bridge inverter and the ground GND_PWR of the DC power source. In one embodiment, the resonant tank circuit includes a DC blocking capacitor C_DC connected between the junction of the resonant inductor L1 and resonant capacitor C11 and the output of the resonant tank circuit.

An isolating transformer is connected to the output of the resonant tank circuit. The isolating transformer includes a primary winding T2P and a secondary winding T2S1, T2S2. The primary winding T2P is connected between the output of the resonant tank circuit and the ground GND_PWR of the DC power source. The output rectifier 812 has an input connected to the secondary winding T1S1, T1S2 of the isolating transformer and an output connected to the light source 116. In one embodiment, the turns ratio of the isolating transformer is selected as a function of a voltage of the power rail V_RAIL of the DC power source and a predetermined output voltage limit. In one embodiment, the output voltage limit is 60 VDC.

In one embodiment, the secondary winding T1S1, T1S2 of the isolating transformer is connected to a circuit ground CKT_GND which is isolated from the ground GND_PWR of the DC power source by the isolating transformer. Specifically, the secondary winding includes first secondary winding T1S1 and second secondary winding T1S2, each connected to the circuit ground CKT_GND. The first secondary winding T1S1 and the second secondary winding T1S2 are connected out of phase with one another.

The output rectifier includes a first output diode D11 and a second output diode D12. The first output diode D11 has its anode connected to the first secondary winding T1S1 and a cathode coupled to the light source 116 (i.e., an output of the driver circuit 804 and ballast 806). The second output diode D12 has an anode connected to the second secondary winding T1S2 and a cathode coupled to the light source 116 (i.e., the output of the driver circuit 804 and ballast 806).

In one embodiment, an output capacitor C12 is connected between the output of the output rectifier 812 and the circuit ground CKT_GND to smooth or stabilize the output voltage of the driver circuit 804 and ballast 806. In one embodiment, a current sensing resistor R4 is connected between the circuit ground CKT_GND and the light source 116. A first terminal of the current sensing resistor R4 is connected to the circuit ground CKT_GND, and a second terminal of the current sensing resistor is connected to the light source 116. Thus, a voltage across the current sensing resistor R4 is proportional to a current through the light source 116. The controller 826 is connected to the circuit ground CKT_GND and the second terminal of the current sensing resistor R4 to monitor the voltage across the current sensing resistor and sense the current provided to the light source 116 by the ballast 806.

In one embodiment, the driver circuit 804 further includes a gate drive transformer. The gate drive transformer receives the gate drive signal from the controller 826 which controls the switching frequency of the half-bridge inverter. The gate drive transformer includes a primary winding T2P, a first secondary winding T2S1, and a second secondary winding T2S2. In this embodiment, the first switch Q11 and the second switch Q12 of the half-bridge inverter each have a high terminal, a low terminal, and a control terminal. The high terminal of the first switch Q11 is connected to the power rail V_RAIL of the DC power source. The low terminal of the second switch Q12 is connected to the ground GND_PWR of the DC power source. The high terminal of the second switch Q12 is connected to the low terminal of the first switch Q11. A gate drive capacitor C13 is connected in series with the primary winding T2P of the gate drive transformer across a gate drive output (i.e., gate_H and gate_L) of the controller 826. A first gate drive resistor R11 is connected in series with the first secondary winding T2S1 of the gate drive transformer between the control terminal of the first switch Q11 and the output of the half-bridge inverter. A second gate drive resistor R12 is connected in series with the second secondary winding T2S2 of the gate drive transformer between the control terminal of the second switch Q12 and the ground PWR_GND of the DC power circuit. The polarities of the first secondary winding T2S1 and the second secondary winding T2S2 of the gate drive transformer are opposed such that the first switch Q11 and the second switch Q12 are driven out of phase by the gate drive transformer.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

Terms such as "wire," "wiring," "line," "signal," "conductor," and "bus" may be used to refer to any known structure, construction, arrangement, technique, method and/or process for physically transferring a signal from one point in a circuit to another.

Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An LED driver tuning system comprising:
   first and second input power terminals;
   a power converter configured to generate an output voltage and an output current for driving an LED array, responsive to input power provided across the first and second input power terminals during an online mode of operation;
   a tuning interface device configured for coupling to at least the first and second input power terminals during an offline mode of operation;
   a controller configured to generate a dimming control signal based on an input received across first and second dimming input terminals during an online mode of operation, and
   the controller configured during the offline mode of operation to modify one or more programmed operating parameters based on a predetermined sequence of digital pulses received via the tuning interface device;
   wherein the output voltage and the output current generated by the power converter is regulated during the online mode of operation based on the dimming control signal, a sensed output from the power converter, and the one or more programmed operating parameters.

2. The system of claim 1, further comprising:
   a capacitor coupled on a first end between the first input power terminal and the power converter;
   an isolation circuit having a first side coupled between a second end of the capacitor and the second input power terminal and a second side coupled to the controller,
   wherein substantially zero voltage is provided from the first side to the second side of the isolation circuit during the online mode of operation,
   further wherein the predetermined sequence of digital pulses received from the tuning interface device are transmitted to the controller via the first side and the second side of the isolation circuit.

3. The system of claim 2, wherein the tuning interface device is configured to provide high-frequency bursts in a coded envelope sequence, and
   the second side of the isolation circuit comprises a tuning signal receiving circuit configured to generate a sequence of digital pulses corresponding to the burst envelope sequence,
   wherein the controller is configured to decode the sequence of digital pulses corresponding to the burst envelope sequence and determine the one or more programmed parameters for the predetermined sequence of digital pulses.

4. The system of claim 3, wherein the second side of the isolation circuit comprises a diode rectifier circuit coupled across an input from the first side of the isolation circuit, and
wherein the tuning signal receiving circuit is coupled across an output end of the diode rectifier circuit and a circuit ground.

5. The system of claim 4, wherein the second side of the isolation circuit further comprises a tuning confirmation circuit coupled to the controller and configured to short the output end of the diode rectifier circuit to circuit ground in response to a predetermined sequence of digital pulses received from the controller and corresponding to the predetermined sequence of digital pulses received by the controller from the tuning signal receiving circuit.

6. The system of claim 5, wherein the tuning confirmation circuit further comprises a switching element coupled across the output end of the diode rectifier circuit and the circuit ground and having its gate electrode coupled to the controller,
wherein a tuning confirmation voltage corresponding to a high (1) digital pulse received via the controller turns on the switching element, and a tuning confirmation voltage corresponding to a low (0) digital pulse received via the controller turns off the switching element, and
further wherein the tuning confirmation voltage is coupled to an input terminal for the tuning interface device, and the tuning interface device compares a sequence of tuning confirmation voltage inputs to an inverse of the predetermined sequence of digital pulses to determine whether the sequences match.

7. The system of claim 1, wherein the one or more programmed operating parameters comprise a maximum output current generated by the power converter.

8. The system of claim 7, wherein the power converter is regulated to provide constant output power control during the online mode of operation.

9. The system of claim 8, wherein the controller is configured to identify a target maximum output current based on a predetermined sequence of digital pulses received via the tuning interface device, and is configured to further modify the programmed maximum output current and a programmed maximum output voltage based on the target maximum output current and a programmed constant power for the power converter.

10. An LED driver circuit comprising:
first and second input power terminals;
a power converter configured to generate an output voltage and an output current for driving an LED array, responsive to mains input power provided across the first and second input power terminals during an online mode of operation;
a controller configured to generate a dimming control signal based on an input received across first and second dimming input terminals during an online mode of operation; and
the controller configured during the offline mode of operation to modify one or more programmed operating parameters based on a predetermined sequence of digital pulses received via the first and second input power terminals during an offline mode of operation;
wherein the output voltage and the output current generated by the power converter is regulated during the online mode of operation based on the dimming control signal, a sensed output from the power converter, and the one or more programmed operating parameters.

11. The LED driver circuit of claim 10, further comprising:
a capacitor coupled on a first end between the first input power terminal and the power converter;
a first side of an isolation circuit coupled between a second end of the capacitor and the second input power terminal; and
a second side of the isolation circuit coupled to the controller,
wherein substantially zero voltage is provided from the first side to the second side of the isolation circuit during the online mode of operation,
further wherein the predetermined sequence of digital pulses received via the first and second input power terminals are transmitted to the controller via the first side and the second side of the isolation circuit.

12. The LED driver circuit of claim 11, wherein the second side of the isolation circuit comprises
a diode rectifier circuit coupled across an input from the first side of the isolation circuit,
a tuning signal receiving circuit coupled across an output end of the diode rectifier circuit and a circuit ground,
wherein the second side of the isolation circuit is configured to receive high-frequency bursts provided in a coded envelope sequence during the offline mode of operation, and generate a sequence of digital pulses corresponding to the burst envelope sequence,
wherein the controller is configured to decode the sequence of digital pulses corresponding to the burst envelope sequence and determine the one or more programmed parameters for the predetermined sequence of digital pulses.

13. The LED driver circuit of claim 12, wherein the second side of the isolation circuit further comprises a tuning confirmation circuit coupled to the controller and configured to short the output end of the diode rectifier circuit to circuit ground in response to a predetermined sequence of digital pulses received from the controller and corresponding to the predetermined sequence of digital pulses received by the controller from the tuning signal receiving circuit.

14. The LED driver circuit of claim 13, wherein the tuning confirmation circuit further comprises a switching element coupled across the output end of the diode rectifier circuit and the circuit ground and having its gate electrode coupled to the controller,
wherein a tuning confirmation voltage corresponding to a high (1) digital pulse received via the controller turns on the switching element, and a tuning confirmation voltage corresponding to a low (0) digital pulse received via the controller turns off the switching element.

15. The LED driver circuit of claim 10, wherein the one or more programmed operating parameters comprise a maximum output current generated by the power converter.

16. The LED driver of claim 15, wherein the power converter is regulated to provide constant output power control during the online mode of operation.

17. The LED driver of claim 16, wherein the controller is configured to identify a target maximum output current based on a predetermined sequence of digital pulses received via the tuning interface device, and is configured to further modify the programmed maximum output current and a programmed maximum output voltage based on the target maximum output current and a programmed constant power for the power converter.

18. A method of dynamically adjusting one or more programmed parameters for an LED driver circuit comprising first and second input power terminals, a power converter having first and second output terminals for connecting to an LED load, a dimming interface circuit having first and second input terminals, and a controller operable during an online mode of operation to regulate operation of the power converter based at least on the dimming control signal, a sensed output from the power converter, and the one or more programmed parameters, the method comprising:

initiating an offline mode of operation by removing an input power source from the first and second input power terminals and thereby disabling the power converter;

coupling a tuning interface device across the first and second input power terminals;

generating a predetermined sequence of digital pulses from the tuning interface device, the sequence of digital pulses corresponding to one or more programmed parameters;

decoding the sequence of digital pulses to identify target values for the one or more programmed parameters;

modifying the target values for the one or more programmed parameters in the controller; and initiating an online mode of operation by removing the tuning interface device and reconnecting the input power source to the first and second input power terminals, wherein the controller regulates operation of the power converter during the online mode in accordance with the modified target values for the one or more programmed parameters.

19. The method of claim 18, wherein generating a predetermined sequence of digital pulses from the tuning interface device comprises:

providing high-frequency bursts from the tuning interface device in a coded envelope sequence, and generating a sequence of digital pulses corresponding to the burst envelope sequence.

20. The method of claim 18, further comprising:

generating from the controller a predetermined sequence of digital pulses inversely corresponding to the predetermined sequence of digital pulses from the tuning interface device, and decoding the inversely corresponding predetermined sequence of digital pulses at the tuning interface device to determine whether the sequences match, wherein proper tuning of the controller is confirmed.

\* \* \* \* \*